Nov. 17, 1959 J. POLYZOU ET AL 2,913,711

SIGNAL CONTROL SYSTEM

Filed Oct. 15, 1954 2 Sheets-Sheet 1

INVENTORS
JAMES POLYZOU
JACOB L. JATLOW
BY Robert Harding Jr.
ATTORNEY

SIGNAL CONTROL SYSTEM

Filed Oct. 15, 1954

INVENTORS
JAMES POLYZOU
JACOB L. JATLOW
BY Robert Harding Jr.
ATTORNEY

United States Patent Office 2,913,711

Patented Nov. 17, 1959

2,913,711

SIGNAL CONTROL SYSTEM

James Polyzou, Nutley, N.J., and Jacob Lawrence Jatlow, Bronx, N.Y., assignors to International Telephone and Telegraph Corporation, New York, N.Y., a corporation of Maryland Application October 15, 1954, Serial No. 462,567

11 Claims. (Cl. 340—253)

This invention relates to electric signalling systems and more particularly to remote control and supervisory systems.

The invention concerns apparatus for controlling trip circuit mechanisms and the blocking of operations thereof under given conditions. The invention is particularly suited for, but not necessarily limited to, voice frequency siganlling systems. A trip circuit is one which functions to open an electric utilization circuit under abnormal conditions. In remotely controlled signalling systems wherein a plurality of cooperating receiving and transmitting stations are coupled to a common signalling path, it is desirable to incorporate trip circuits in each station to indicate particular types of faults at any cooperating station. Should a particular type of fault occur to certain equipment of any of the cooperating stations, a characteristic signal is transmitted over the signalling path to cause tripping of apparatus which acts to disconnect corresponding equipment at other stations thereby protecting the corresponding equipment from damage until the fault is cleared at the first station. It is customary to use voice frequency signalling to control the tripping equipment at the several stations of the network and distinctive frequencies are impressed upon a carrier to indicate normal or abnormal conditions at the several network stations. Accordingly audio tone signalling employing the frequency shift method of keying is utilized to continuously transmit either a "space" frequency or a "mark" frequency, the "mark" frequency, for example, serving to indicate a fault, and the "space" frequency indicating normal conditions.

It is important that the trip circuit should not be operated except when there is a fault and therefore the trip circuit should not be operated by spurious noise, failure of the signal carrier or due to faults in the signal receiving equipment.

It is therefore an object of the present invention to provide a signalling system designed to operate a trip circuit in which operation of the trip circuit is blocked where a spurious signal, such as noise above a given amplitude level, has been introduced in the signal path.

In accordance with a feature of the present invention the trip circuit is blocked when the ratio of tone plus noise, to tone signal is above a given level.

A further object of this invention is the provision of such a system in which operation of the trip circuit is blocked when the signal carrier is absent from the signal path.

Additionally a further object of this invention is to block operation of the trip circuit at a station where certain faults develop in the signal receiving equipment at that station.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
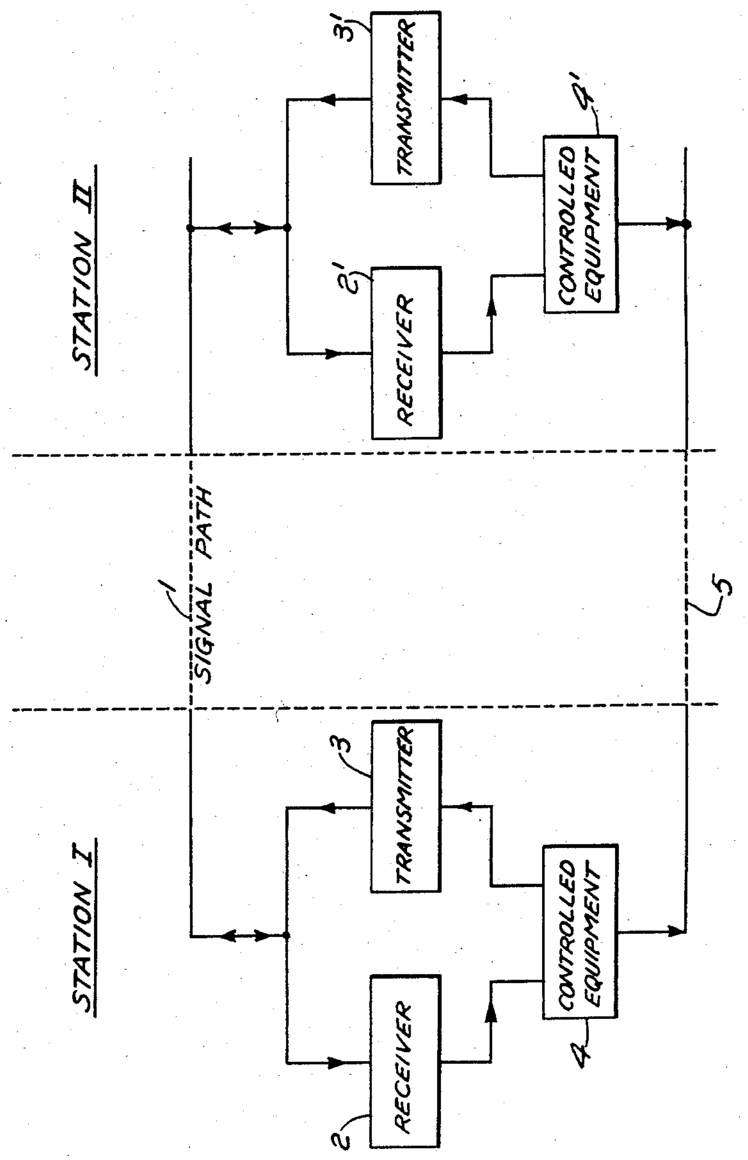
Fig. 1 is a block diagram of a signalling system utilizing the invention.

Referring now to Fig. 1 there is shown in block form elements contained in a remote control signalling system consisting of two stations I and II interconnected by a signal path 1. Station I comprises a receiver 2 capable of receiving two distinct tonal freqencies indicative of the space or mark condition. Station I also contains a transmitter 3 capable of transmitting two different frequencies corresponding to the space or mark condition. It will be noted that both the receiver and transmitter are coupled to the signal path 1. The output of the receiver is coupled to the controlled equipment 4 and is adapted to deactivate it when a fault signal is received over the path 1. The controlled equipment 4 is connected to an output line 5. Station II is provided with identical equipment hereinabove described with respect to Station I and like elements are provided with prime reference numerals. The coupling of the equipment at Stations I and II is such that a fault occurring in the controlled equipment at either of said stations will cause the associated transmitter 3 thereat to transmit a signal over the signal path to be received by the receiver 2 at the distant station and which in turn would deactivate the controlled equipment thereat to prevent injury thereto. Fault-responsive equipment which causes the transmitters to send a distinctive signal is well known to the art and forms no part of this invention. Should a burst of noise or other spurious transient appear on the signal path 1, it is desirable to prevent the operation of the tripping mechanism associated with the receivers 2, 2' and the deactivation of the controlled equipment 4, 4'.

Figure 2:
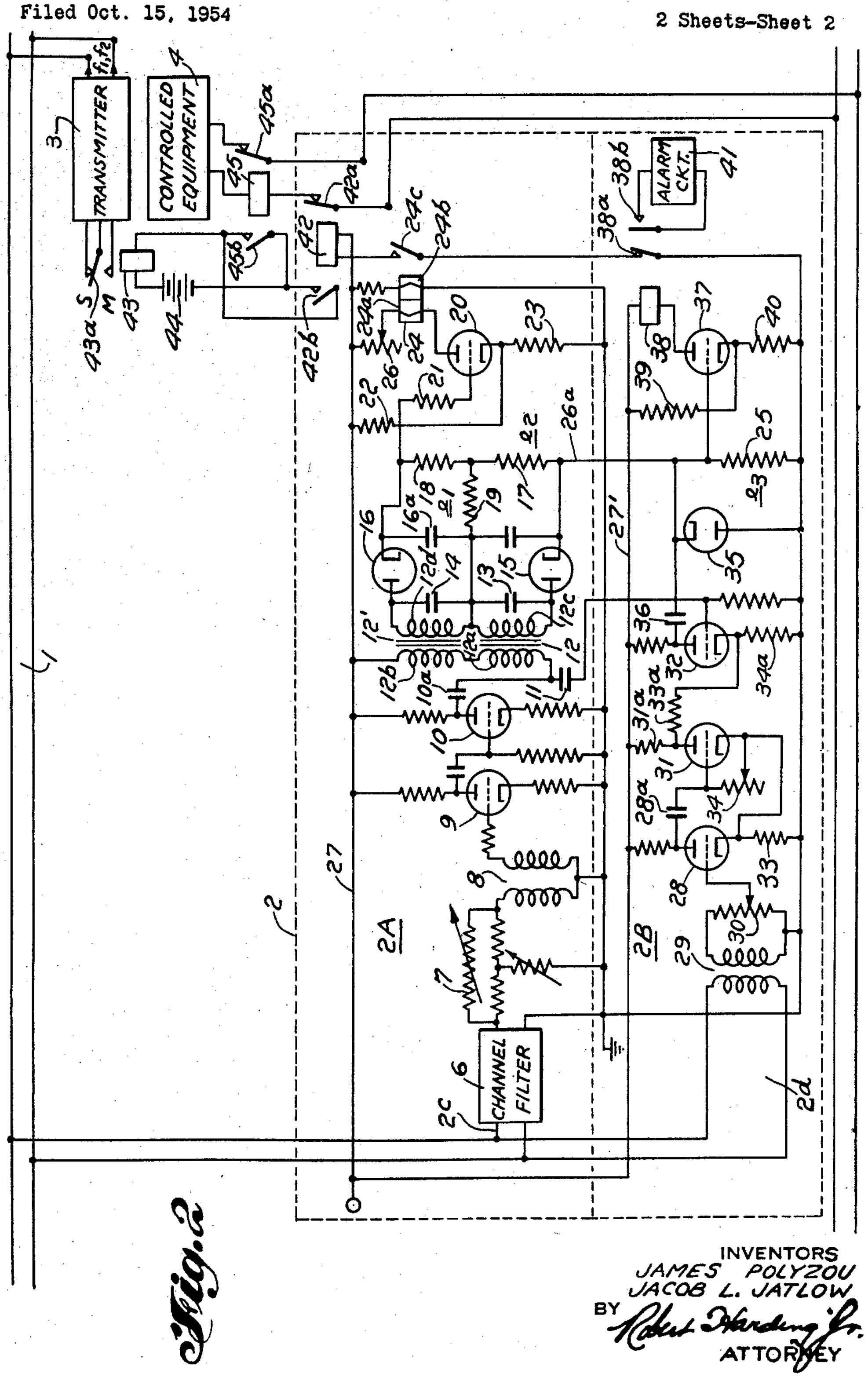
Fig. 2 is a schematic diagram of apparatus used at one of the stations shown in Fig. 1.

Referring now to Fig. 2, the receiver 2 is composed of two separate portions indicated generally at 2A and 2B. The receiver portion 2A is coupled to the signal path 1 by means of the input path 2C leading to the input of a channel filter 6. Filter 6 is a band pass filter passing the space and mark frequencies only. The output of channel filter 6 is fed via a T-pad attenuator to the primary of a transformer 8 whose secondary is coupled to the input of triode 9. The tubes 9 and 10 constitute a limiting amplifier to produce a constant amplitude output wave. The output of tube 10 is fed via coupling condenser **10*a* to two separate paths, one through condenser 11 and the other through the serially connected primary windings 12*a* and 12*b*, of transformers 12, 12', respectively. Secondary windings 12*c* and 12*d* of the transformers 12, 12' are inductively coupled with primary windings 12*a* and 12*b* respectively, and with their associated shunt condensers 13 and 14, respectively constitute a discriminator with resonant circuits having periods approximately equal to the frequency of received space and mark signals, respectively. Coupled to opposite ends of windings 12*c* and 12*d* are diodes 15 and 16, respectively, in said discriminator circuit. The cathode of diode 15 is serially connected to the cathode of diode 16 via resistance 17 and 18. The junction of resistances 17 and 18 is coupled to the junction of windings 12*c* and 12*d* via resistance 19. The cathode end of resistance 18 is connected to the grid of triode 20 via resistance 21. The cathode end of resistance 17 is connected to ground via resistance 25. On the receipt of a mark signal, diode 16 will conduct and a voltage $e1$ will appear across resistance 18. A voltage of lesser magnitude $e2$ will develop across resistance 17. Triode 20 is normally biased to cut-off by means of a voltage divider constituted by resistances 22 and 23 shunted across the anode supply. Thus, in the absence of sufficient positive signal on the grid of triode 20, triode 20 remains cut-off. A double winding polar relay 24 has its operating winding 24*a* serially connected between the anode of triode 20 and the positive terminal of the anode supply via variable resistance 26 and operates upon conduction of triode 20, to close contacts 24*c*. Winding 24*b* is a biassing winding adapted to normally cause the relay 24 to operate in opposite direction thus opening contacts 24*c***.

Operation of relay 24 operates the trip-mechanism, as is described hereinafter. As stated before, relay 24 is a polar relay. The relay armature is part of a magnetic bridge circuit and is subject to a condition of unstable balance, i.e. with no current applied to the relay windings, the armature may swing to the right, to the left or may even stay in a neutral position. For this reason, it is necessary to have winding 24*b* which will serve to disrupt the balance of the magnetic circuit such that in the absence of current on winding 24*a*, the relay armature will return to the predetermined idle position.

Furthermore, it is because of the intermediate position of the armature under no current conditions that it becomes necessary to insert the contacts 38*a* of relay 38 in series with the contacts 24*c* so that with loss of operating potential at the station, the circuit formerly completed by these two contacts will be opened through the action of relay 38.

Portion 2B of the receiver 2 contains the trip blocking circuit and consists of an input path 2*d* coupled in parallel with the path 2*c* to the signal path 1. Input path 2*d* is coupled to the input of a trigger tube 28 by means of the transformer 29 and the potentiometer 30 in shunt with the secondary of transformer 29. Tube 31 has its input electrode coupled to the anode circuit of tube 28 by means of coupling condenser 28*a*. The cathode of both tubes 28 and 31 are connected and held above ground potential by means of common cathode resistor 33. The anode circuit of tube 31 is directly coupled to the cathode of gate tube 32, via resistance 33*a*. It will be observed that the anode load resistance 31*a* coupled between the anode of tube 31 and the positive anode supply constitutes with resistances 33*a* and 34, a voltage divider which maintains the cathode of tube 32 positive and tends to block conduction of tube 32 except that normally tube 31 conducts and unblocks tube 32. The cathode of diode 35 is coupled to the anode of tube 32 via coupling condenser 36 and is also connected to the grid of triode 37. A relay 38 is serially connected between the positive anode supply and the anode of tube 37. The cathode of tube 37 is maintained at a potential above ground by means of voltage divider 39 and 40 which tends to block conduction of tube 37 in the absence of a positive signal on its grid derived from tube 32. Relay 38 has a pair of contacts 38*a* and 38*b*; the contacts 38*b* controlling a normally open alarm circuit 41. Contacts 38*a* are normally closed and prepare a circuit for the operation of trip relay 42. Trip relay 42 is provided with cooperating contacts 42*a* and 42*b* and will operate when the contact 24*c* is closed to complete the prepared circuit. Relay 42 controls the deactivation of the controlled equipment 4. Overload relay 45 connected to the controlled equipment 4 will open its contacts 45*a* in the event of a local fault at the controlled equipment and will also close its contacts 45*b* to complete a circuit for transmitting relay 43 associated with the transmitter 3 causing it to send a mark frequency indicating a fault. Battery 44 energizes relay 43. Contacts 42*b* associated with the trip relay 42 are in shunt with contacts 45*b* and form an alternative operating circuit for the relay 43 over an obvious path. The operation of the device will now be given under various conditions as follows:

(A) *Mark signals being received with noise below predetermined level*

The mark signal received over path 1 passes through portion 2*a* of the receiver as follows. The mark signal passes through channel filter 6 and being brought to a constant level in the limiter consisting of 9 and 10 passes to the discriminator via primary 12*a* and 12*b*. The resonant circuit consisting of secondary 12*d* and condenser 14 is tuned to the mark frequency and produces an output via diode 16 which charges condenser 16*a* in such a direction that the potential applied to the grid of tube 20 is positive.

The incoming mark signal is also introduced to portion 2B of the receiver via input transformer 29. Tube 28 is so biassed that it will not conduct if the mark signal is received without substantial additional energy such as for example from noise. Therefore when the mark received plus the additional noise is below a predetermined level, tube 28 still remains cut off, and tubes 31 and 32 continue to conduct. To the grid of conducting tube 32 there is applied a voltage derived from the anode of tube 10. This voltage is the result of the mark signal being fed through tube 10. This signal in turn is passed to the anode of tube 32 and is clamped by diode 35 to a D.C. level and applied across resistance 25 to produce a potential *e*3 which is applied to the bottom end of resistor 17. This potential is in series with the potential developed by the mark signal across resistor 18 and is in a vectorial direction to add to this potential thereby producing a sufficient voltage on the grid of tube 20 to cause said tube to conduct. The conduction of this tube operates relay 24 to cause contacts 24*c* to close thereby energizing trip relay 42. Energization of trip relay 42 deactivates the controlled equipment and sends an acknowledging signal over signal path 1.

(B) *Mark signal being received with noise above the predetermined level*

When the mark signal is accompanied by noise above the predetermined level, it will be sufficient to cause tube 28 to conduct and, by triggering action, block tube 31. The blocking of tube 31 blocks tube 32 thus preventing the mark signal from tube 10 passing through tube 32. The voltage drop *e*3 across resistance 25 which was sufficient in conjunction with the mark signal potential drop across 18 to cause tube 20 to conduct is now absent, and consequently tube 20 cannot conduct. Since tube 20 does not conduct, relay 24 does not operate to marking; contact 24*c* is open and the trip relay 42 will not operate. The trigger circuit consisting of tubes 28 and 31 derives its operating voltage ahead of filter 6. Since bandpass filters inherently present a time delay to the pass frequencies, any noise which simulates the pass frequencies will arrive at the discriminator somewhat later than the voltage arriving to the trigger circuit. The trigger circuit responds instantaneously to peak noise voltages which exceed its threshold, hence the blocking action of the trigger circuit will disable tube 20 before the discriminator voltage can act on the grid of this tube. The blocking action will persist for a length of time determined principally by the RC time constant of resistor 34 and condenser 28*a*.

(C) *Space signals being received indicating normal conditions*

When a space signal is received it passes in portion 2A of the receiver through the channel filter and through tube 10 to the discriminator where voltage *e*2 is produced across resistor 17 which has polarity such as to oppose conduction of tube 20. This potential is sufficient to block tube 20 even though an additional voltage applying the aforesaid voltage is received from section 2B of the equipment due to the space frequency being rectified through tube 32 and applied to the bottom end of resistor 17. Thus whenever a space signal is received, tube 20 cannot conduct and relay 24 remains in spacing condition and relay 42 does not operate. It will also be recognized, that even if noise accompanies the space signals, this will not result in the conduction of tube 20 either since the effect of a large noise would be merely to remove the voltage applied from tube 32 to the bottom end of resistor 17.

(D) *Carrier signal fails and neither mark nor space signals are received*

If neither mark nor space signal is received, even though gate tube 31 is conducting no output signal will be received from tube 10 and consequently no voltage will be applied to the bottom end of resistor 17. Furthermore tube 37 which is normally conducting on receipt of mark or space signal thereupon cuts off and relay 38 deenergizes causing contacts **38*b* to close the alarm circuit 41 to notify an attendant that the carrier is lost and also prevents relay 42 from operating. Tube 20 however remains cut off and relay 24** remains in spacing condition.

(E) *Anode voltage fails at the station*

Upon failure of anode voltage, tube 37 ceases to conduct and relay 38 deenergizes thereby causing operation of alarm circuit 41 and by opened contacts **38*a* relay 42** is prevented from operating.

The time constants of the trigger circuit will determine the time during which tube 31 remains cuts off following the receipt of a signal of the required amplitude (made up of a mark plus spurious signal), so that once the blocking circuit operates, it will not unblock until a predetermined time thereafter.

It will be noted that relay 42 cannot energize unless relay 24 is in marking condition and relay 38 is energized. Thus if the carrier is lost, as described in paragraph "D" above, relay 42 will not operate.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An electric signalling system comprising means for receiving signals having first and second characteristics, utilization means, means intermediate said receiving means and said utilization means for deriving first and second voltages from received signals having one of said characteristics, said voltages having opposite signs respectively and for deriving a third voltage from received signals having either of said characteristics, and means coupled to said voltage deriving means for combining said third voltage with either of said first or said second voltages, and control means intermediate said utilization means and said voltage combining means for controlling operation of said utilization means only upon the combination of said first and said third voltages and switch means comprising a trigger circuit having time delay means and a gating circuit coupled in tandem therewith, said trigger circuit adapted to control operation of said gate circuit, said gate circuit being intermediate the means for deriving said third voltage and said trigger circuit, whereby a signal plus a predetermined quantity of noise will render said last-mentioned voltage deriving means inoperable.

2. An electric signalling system as claimed in claim 1, wherein said receiving means comprises a limiting amplifier intermediate the means for deriving said first and said second voltages and said signal source, said amplifier having a plurality of outputs, each output coupled to a different one of the means for deriving said three voltages.

3. An electric signalling system as claimed in claim 2, wherein the means for deriving said first and said second voltages comprises a discriminator having a pair of frequency responsive devices, each device having an input coupled to a different one of said amplifier outputs a resistance network coupled to an output of said devices, a first terminal of said network connected to said utilization means and another terminal of said network serially connected to the means for deriving said third voltage.

4. An electric signalling system as claimed in claim 3, wherein said utilization means comprises an electron switch device, said device adapted to operate upon the application thereto of said first and said third voltages.

5. An electric signalling system as claimed in claim 3, wherein the means for deriving said third voltage comprises a rectifying device coupled to third one of said amplifier outputs, a resistance network shunted across said rectifying device, said network having a terminal connected to the resistance network associated with said frequency responsive devices.

6. An electric signalling system as claimed in claim 2, wherein said gating circuit comprises an electron discharge device having a control electrode, coupled to an output of said amplifier, biassing means for normally biassing said discharge device to conduct upon the receipt of an output from said amplifier, said trigger means adapted to increase the bias applied to said discharge device upon the incoming of a signal of more than a predetermined magnitude upon application of which said discharge device ceases to conduct.

7. An electric signalling system as claimed in claim 6, wherein said trigger circuit comprises an electronic two-condition device adapted to maintain said discharge device conducting when assuming one condition and to cause said discharge device to cease conducting when assuming the other condition.

8. An electric signalling system as claimed in claim 7, wherein said biassing means comprises a voltage divider, said discharge device having an electrode connected to a first point of potential on said divider, said two-position device comprising a pair of electron discharge devices coupled as one-shot multivibrators, one of the tubes of said pair having an electrode connected to a second point of potential on said divider.

9. An electric signalling system as claimed in claim 1, wherein said utilization means comprises an electron discharge device normally biassed to non-conduction, a relay having a winding serially connected between the space discharge path of said last named discharge device and a source of energizing potential, said relay adapted to operate upon conduction of said discharge device.

10. An electric signalling system as claimed in claim 9, further comprising additional relay means under control of contacts associated with said first named relay, said relay means comprising a further relay having two pairs of operating contacts, one pair of said contacts adapted to selectively control transmission of signals having two different characteristics, respectively, and the other pair of said contacts adapted to open a work circuit in response to a signal having a given characteristic and of a predetermined amplitude level.

11. An electric signalling system as claimed in claim 10, wherein said utilization means further comprises an additional electron discharge device, an alarm circuit, a second relay having a pair of contacts for controlling operation of said alarm circuit, said relay having a winding serially connected between the discharge path of said last named discharge device and a source of energizing potential, said last named discharge device coupled to the means for deriving said third voltage adapted to normally conduct upon the derivation of said third voltage, said relay adapted to control operation of said alarm circuit upon the failure to receive signals of either of said characteristics or of failure of the source of energizing potential.

References Cited in the file of this patent

UNITED STATES PATENTS

| | | |
|---|---|---|
| 2,261,643 | Brown | Nov. 4, 1941 |
| 2,307,771 | Denton | Jan. 12, 1943 |
| 2,410,149 | Clark | Oct. 29, 1946 |
| 2,509,381 | Werner et al. | May 30, 1950 |
| 2,515,553 | Flowers | July 18, 1950 |
| 2,533,543 | Young | Dec. 12, 1950 |
| 2,572,074 | Terry | Oct. 23, 1951 |
| 2,588,031 | O'Brien et al. | Mar. 4, 1952 |
| 2,615,984 | Lenehan | Oct. 28, 1952 |
| 2,677,014 | Moynihan | Apr. 27, 1954 |
| 2,706,810 | Jacobsen | Apr. 19, 1955 |
| 2,761,060 | Bradley et al. | Aug. 28, 1956 |